United States Patent
Matsumura et al.

(10) Patent No.: US 8,727,055 B2
(45) Date of Patent: May 20, 2014

(54) ELECTRIC WORK VEHICLE AND BASE THEREOF

(75) Inventors: Yukinori Matsumura, Isehara (JP); Yoshiyuki Takano, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/982,615

(22) PCT Filed: Mar. 16, 2012

(86) PCT No.: PCT/JP2012/056818
§ 371 (c)(1), (2), (4) Date: Jul. 30, 2013

(87) PCT Pub. No.: WO2012/128196
PCT Pub. Date: Sep. 27, 2012

(65) Prior Publication Data
US 2013/0299255 A1  Nov. 14, 2013

(30) Foreign Application Priority Data
Mar. 24, 2011 (JP) .................................. 2011-066122

(51) Int. Cl.
*B60R 16/04* (2006.01)
(52) U.S. Cl.
USPC ........................................................ 180/68.5
(58) Field of Classification Search
USPC ..................... 180/68.1–68.5, 54.1, 69.5, 69.6
See application file for complete search history.

(56) References Cited

U.S. PATENT DOCUMENTS

| | | | |
|---|---|---|---|
| 7,374,208 B2* | 5/2008 | Yamamoto et al. | 280/834 |
| 7,810,597 B2* | 10/2010 | Imashige | 180/69.2 |
| 8,540,042 B2* | 9/2013 | Atarashi et al. | 180/68.1 |

FOREIGN PATENT DOCUMENTS

| | | |
|---|---|---|
| JP | 2000-27235 A | 1/2000 |
| JP | 2008-44408 A | 2/2008 |
| JP | 2010-121328 A | 6/2010 |
| WO | 2011/158686 A1 | 12/2011 |

OTHER PUBLICATIONS

International Search Report for PCT/JP2012/056818, issued on Jun. 19, 2012.

* cited by examiner

*Primary Examiner* — John Walters
*Assistant Examiner* — James Triggs
(74) *Attorney, Agent, or Firm* — Global IP Counselors, LLP (57) ABSTRACT

A base frame for an electric work vehicle equipped with a battery-driven electric motor includes a base plate, a plurality of device installation compartment plates and a battery accommodation compartment plate. The device installation compartment plates are fixed onto the base plate, and form a plurality of installation regions for mounting a variety of devices of the vehicle onto the base plate. The battery accommodation compartment plate is fixed onto the base plate, and forms a region for accommodating a plurality of batteries in an inside thereof.

11 Claims, 8 Drawing Sheets

ELECTRIC WORK VEHICLE AND BASE THEREOF

CROSS-REFERENCE TO RELATED APPLICATIONS

This application claims priority to Japanese Patent Application No. 2011-066122, filed on Mar. 24, 2011, the disclosure of which is hereby incorporated herein by reference in its entirety.

BACKGROUND

1. Field of Invention

The present invention relates to a base frame, particularly to a base frame for an electric work vehicle equipped with a battery-driven electric motor, and relates to an electric work vehicle provided with the same.

2. Background Information

In recent years, electric work vehicles have been proposed in the field of work vehicles such as excavators with consideration for environmental problems and so forth. For example, an electric excavator described in Japan Laid-open Patent Application Publication No. JP-A-2000-027235 employs an electric motor to be driven by batteries instead of an engine installed in a well-known hydraulic excavator. Further, a hydraulic pump is configured to be driven by the electric motor and supply hydraulic pressure to a hydraulic cylinder for driving a working machine through a control valve.

At present, a large number of batteries are required for driving an electric motor in such an electric excavator as described above. Further, the batteries are disposed in the rear end portion of a revolving frame, for instance, as described in Japan Laid-open Patent Application Publication No. JP-A-2000-027235.

Here, a revolving frame for a well-known hydraulic excavator is generally structured as described in Japan Laid-open Patent Application Publication No. JP-A-2010-121328. Specifically, the revolving frame includes: a base plate; a pair of partition plates that are mounted onto the base plate while being extended in the back-and-forth direction; and a single front-rear compartment partition plate extended in the vehicle width direction.

SUMMARY

In an electric excavator, a plurality of batteries are generally disposed instead of a counterweight of the well-known excavator. In this case, chances are that the total weight of the batteries exceeds the weight of the counterweight, because a large number of batteries are required at present as described above. In such a case, when a large number of batteries are mounted to the rear end portion of a well-known revolving frame, the revolving frame is distorted in accordance with moving and vibration in vehicle activation due to its insufficient strength. When such distortion of the revolving frame is caused, chances are that actuation failures may be caused in revolving of the revolving frame. Further, the product life of the revolving frame is reduced.

Such a drawback of frame distortion attributed to insufficient strength as described above is not limited to an electric excavator, and is also caused in a general electric work vehicle that a large number of batteries are mounted to the base frame thereof.

It is an object of the present invention to reinforce a base frame and efficiently accommodate batteries on the base frame.

A base frame for an electric work vehicle according to a first aspect of the present invention is a base frame for an electric work vehicle equipped with a battery-driven electric motor, and includes a base plate, a plurality of device installation compartment plates and a battery accommodation compartment plate. The plural device installation compartment plates are fixed onto the base plate and form a plurality of installation regions for mounting a variety of devices of the vehicle onto the base plate. The battery accommodation compartment plate is fixed onto the base plate and forms a region for accommodating a plurality of batteries in an inside thereof.

Here, the device installation regions are formed by the plural device installation compartment plates, while the battery accommodation region is formed by the battery accommodation compartment plate. These compartment plates also function as ribs for reinforcing the base frame. Therefore, the base frame is enhanced in its strength. Especially, the battery accommodation compartment plate forms the battery accommodation region and also functions as the rib for reinforcing the base frame. Therefore, the batteries can be efficiently accommodated on the base frame, while the base frame can be reinforced.

A base frame for an electric work vehicle according to a second aspect of the present invention relates to the base frame of the first aspect, and wherein the battery accommodation compartment plate is disposed on a rear end portion of the base plate in a vehicle back-and-forth direction, and at least has front, rear, right and left plates enclosing the region for accommodating the plurality of batteries.

Here, the battery accommodation compartment plate forms the battery accommodation region on the rear end portion of the base plate. Therefore, the batteries can be mounted instead of a counterweight mounted to a well-known work vehicle.

A base frame for an electric work vehicle according to a third aspect of the present invention relates to the base frame of the second aspect, and wherein the device installation compartment plates include at least one vertical partition plate extended on the base plate from a front portion of the base plate to the rear end portion of the base plate through the battery accommodation region formed by the battery accommodation compartment plate in the vehicle back-and-forth direction.

Here, the vertical partition plate is extended on the base plate from the front portion of the base plate to the rear end portion of the base plate through the battery accommodation region in the vehicle back-and-forth direction. Therefore, the base frame can be further enhanced in its strength, while battery cases can be reliably fixed within the battery accommodation region.

A base frame for an electric work vehicle according to a fourth aspect of the present invention relates to the base frame of the third aspect, and wherein the battery accommodation region accommodates a plurality of battery cases, each of which accommodates a plurality of batteries, in a stacked state. Further, the battery accommodation compartment plate is provided with a fixation bracket to which a pillar for supporting the plurality of battery cases is fixed and which is mounted onto a rear surface of the rear plate of the battery accommodation compartment plate.

Here, the battery accommodation region accommodates the plural battery cases in a stacked state, and each battery case accommodates the plural batteries. Therefore, the battery accommodation region can accommodate the plural batteries. Further, the battery accommodation compartment plate is provided with the fixation bracket mounted to the rear surface of the rear plate thereof, and the battery cases are supported by the pillar fixed to the fixation bracket. Therefore, the battery cases are not required to be provided with a member or mechanism for supporting the battery cases on the front surfaces thereof. Thus, the battery cases can be disposed while being shifted further forwards. This is effective especially for an excavator of a small revolving type that the rear revolving radius thereof is reduced.

A base frame for an electric work vehicle according to a fifth aspect of the present invention relates to the base frame of the fourth aspect, and wherein the battery accommodation compartment plate has at least one partition plate disposed within the battery accommodation region enclosed by the front, rear, right and left plates.

Here, the partition plate is disposed within the battery accommodation region. Therefore, especially the strength in the battery accommodation region can be further enhanced.

A base frame for an electric work vehicle according to a sixth aspect of the present invention relates to the base frame of the fifth aspect, and wherein the at least one partition plate is a portion of the vertical partition plate, which passes through the battery accommodation region.

Here, the partition plate is formed by a portion of the vertical partition plate. Therefore, the strength of the battery accommodation region can be enhanced with the simple structure.

A base frame for an electric work vehicle according to a seventh aspect of the present invention relates to the base frame of the fourth aspect, and wherein the at least one vertical partition plate is disposed in a position corresponding to the fixation bracket in a vehicle width direction.

Here, the battery cases can be rigidly and stably fixed.

A base frame for an electric work vehicle according to an eighth aspect of the present invention relates to the base frame of the third aspect, and wherein the base plate is a plate configured to revolve about a revolving center and forms a part of an upper revolving unit of an excavator. The base plate is provided with a working machine support bracket to which a working machine of the work vehicle is attached and which is mounted onto a front end portion of the base plate. Further, the vertical partition plate is continuously extended from the working machine support bracket to the rear end portion of the base frame.

Here, the base plate of the revolving frame of the excavator is reinforced, and this enables a smooth revolving action. Further, the vertical partition plate is continuously extended from the working machine support bracket to the rear end portion of the base frame. Therefore, the base frame can be further enhanced in its strength.

A base frame for an electric work vehicle according to a ninth aspect of the present invention relates to the base frame of any of the first to eighth aspects, and wherein the device installation compartment plates include at least one horizontal partition plate extended on the base frame in a vehicle right-and-left direction.

Here, the horizontal partition plate extended in the vehicle right-and-left direction is included as one of the device installation compartment plates. Therefore, the base frame can be further enhanced in its strength.

An electric work vehicle according to the present invention includes: a vehicle body frame including the base frame recited in any of the first to ninth aspects; a travelling mechanism connected to the vehicle body frame; a working machine unit including a working machine and a working machine drive part for driving the working machine; an electric motor for driving the travelling mechanism and the working machine unit; and a power source unit that includes the plurality of batteries and is configured to supply electric power to the electric motor.

Advantageous Effects of Invention

In the present invention as described above, the plural compartment plates function as the ribs for reinforcing the base frame. Therefore, the base frame is enhanced in its strength. Further, the battery accommodation compartment plate forms the battery accommodation region and also functions as the rib for reinforcing the base frame. Therefore, the batteries can be efficiently accommodated on the base frame, while the base frame can be reinforced.

DESCRIPTION OF THE EMBODIMENTS

Figure 1:
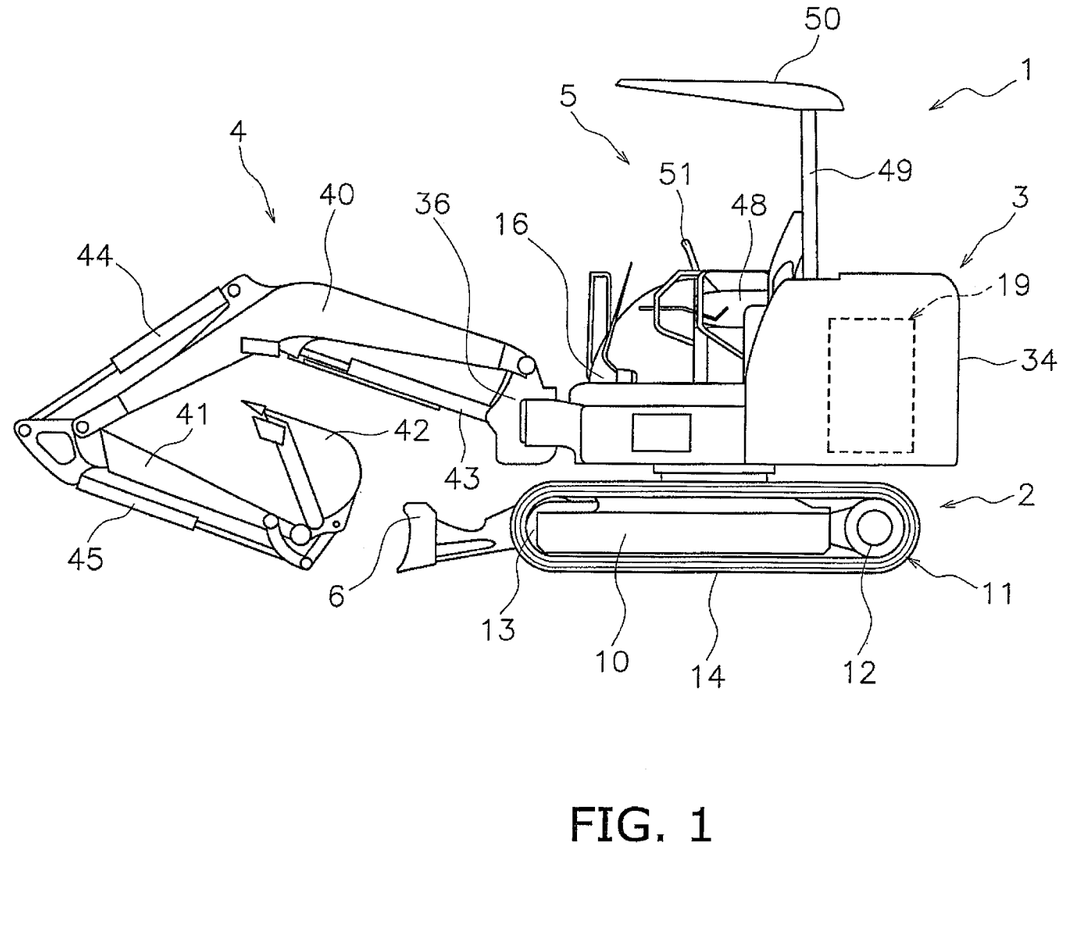
FIG. 1 is a side view of an electric excavator employing a base frame according to an exemplary embodiment of the present invention.

FIG. 1 illustrates an electric excavator provided with a battery holding structure according to an exemplary embodiment of the present invention. The electric excavator 1 is an exemplary electric work vehicle to which the present invention is applied, and is equipped with a battery-driven electric motor instead of an engine installed in a well-known excavator. It should be noted that in the following explanation, the terms "front" and "rear" respectively refer to a forward direction and a rearward direction in the back-and-forth direction of the vehicle. Further, the terms "left" and "right" respectively refer to a leftward direction and a rightward direction in the vehicle width direction with reference to the forward direction of the vehicle.

Overall Structure

As illustrated in FIG. 1, the electric excavator 1 mainly includes a lower travelling unit 2, an upper revolving unit 3, an excavator mechanism 4 and a canopy-type cab 5. Further, a blade 6 is supported by the front part of the lower travelling unit 2, while being pivotable in the up-and-down direction.

The lower travelling unit 2 includes a track frame 10 and a pair of right and left travelling mechanisms 11. Each of the right and left travelling mechanisms 11 includes: a drive wheel 12 supported by the rear end portion of the track frame 10; a driven wheel 13 supported by the front end portion of the track frame 10; and a crawler belt 14 stretched over the drive wheel 12 and the driven wheel 13. The drive wheel 12 is configured to be driven by a travelling motor.

The upper revolving unit 3 is supported by the upper part of the lower travelling unit 2, while being revolvable with respect to the lower travelling unit 2. Specifically, a revolving bearing is mounted to the lower travelling unit 2, whereas a pinion gear meshed with the revolving bearing is mounted to the upper revolving unit 3. Further, through the driving of the pinion gear by a revolving motor (not illustrated in the figures), the upper revolving unit 3 is revolvable on the lower travelling unit 2 in an arbitrary direction.

Figure 2:
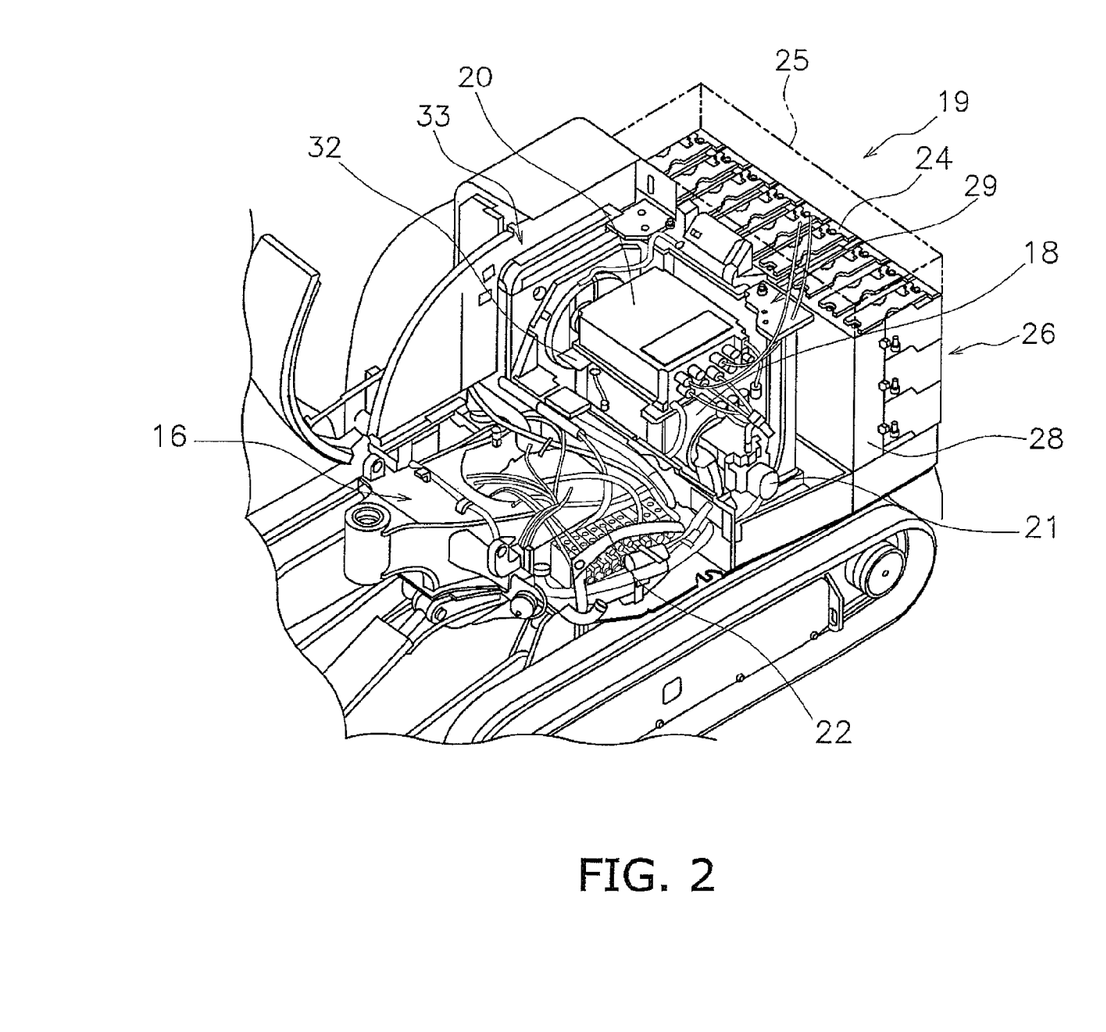
FIG. 2 is an external view of a structure of an upper revolving unit of the electric excavator.

FIG. 2 illustrates an arrangement of the respective devices in the upper revolving unit 3. A condition is herein illustrated where a vehicle body cover and the cab are removed. The upper revolving unit 3 includes a revolving frame (base frame) 16 disposed on the bottom part thereof The revolving frame 16 is supported in a revolvable state by the roughly center part of the track frame 10. As described above, the revolving frame 16 is driven and revolved by the revolving motor. An electric motor 18, a power source unit 19, an inverter device 20, a hydraulic pump 21, a control valve 22 and so forth are disposed on the revolving frame 16. It should be noted that the detailed structure of the revolving frame 16 will be described below.

The power source unit 19 is configured to supply electric power to the electric motor 18, and is disposed on the rear end portion of the revolving frame 16. The power source unit 19 includes a plurality of sealed batteries 24 and a contactor box 25 (depicted with a dashed two-dotted line in FIG. 2). The plural batteries 24 are held by a battery holding structure 26. The battery holding structure 26 will be described below in detail. It should be noted that a canopy mount 29 is disposed forwards of the power source unit 19 through a heat shield plate 28 interposed therebetween.

The electric motor 18 and the hydraulic pump 21 are disposed further forwards of the canopy mount 29. The electric motor 18 is installed in a horizontal position such that the rotary shaft thereof is extended in the right-and-left direction. The hydraulic pump 21 is coupled to the left side of the electric motor 18. Further, the hydraulic pump 21 is connected to the control valve 22 through a hydraulic pipe.

The inverter device 20 is supported by a pair of support members 32 forwardly extended from the canopy mount 29, while being disposed over the electric motor 18. The inverter device 20 includes: an inverter circuit for converting DC power into AC power with an arbitrary frequency; a microcomputer for controlling the inverter circuit; and so forth. A power input of the inverter device 20 is connected to the contactor box 25, whereas a power output is connected to the electric motor 18.

The control valve 22 is disposed further forwards of the hydraulic pump 21. Further, the control valve 22 is connected between the hydraulic pump 21 and the following components: hydraulic cylinders for driving the respective working machines; the revolving motor; and the travelling motor.

It should be noted that other than the aforementioned devices, a refrigeration unit 33 including a radiator, the vehicle body cover 34 (see FIG. 1) for covering components on the revolving frame 16 other than the cab 5, and so forth are disposed on the revolving frame 16. However, the detailed explanation thereof will not be herein made.

As illustrated in FIG. 1, the excavator mechanism 4 includes: a swing post 36 attached to the revolving frame 16; a boom 40, an arm 41 and a bucket 42 that are attached to the revolving frame 16 through the swing post 36; and a plurality of cylinders 43, 44 and 45 for driving the boom and so forth.

The swing post 36 is supported by the tip end of the revolving frame 16 through a pin, while being swingable about a vertical axis. The boom 40 is coupled at the base end thereof to the swing post 36, while being pivotable about a horizontal axis. Further, the hydraulic cylinder 43 for the boom is connected between a roughly middle part of the boom 40 and the swing post 36. The arm 41 is coupled at the base end thereof to the tip end of the boom 40, while being pivotable about a horizontal axis. The hydraulic cylinder 44 for the arm is connected between a roughly middle part of the boom 40 and the base end of the arm 41. The bucket 42 is coupled to the tip end of the arm 41 while being pivotable about the horizontal axis. The hydraulic cylinder 45 for the bucket is connected between the base end of the arm 41 and the bucket 42.

As illustrated in FIG. 1, the cab 5 includes: a seat 48 on which an operator is seated; and console boxes (not illustrated in the figures) installed on the right and left of the seat 48. Further, right and left pillars 49 are disposed on the right and left rear of the seat 48, while the bottom end portions thereof are supported by the canopy mount 29. A canopy 50 is supported by the right and left pillars 49. Furthermore, an operating lever 51 and so forth are mounted forwards of the seat 48 in order to perform operations of the travelling mechanisms 11, the excavator mechanism 4 and so forth.

System Block

Figure 3:
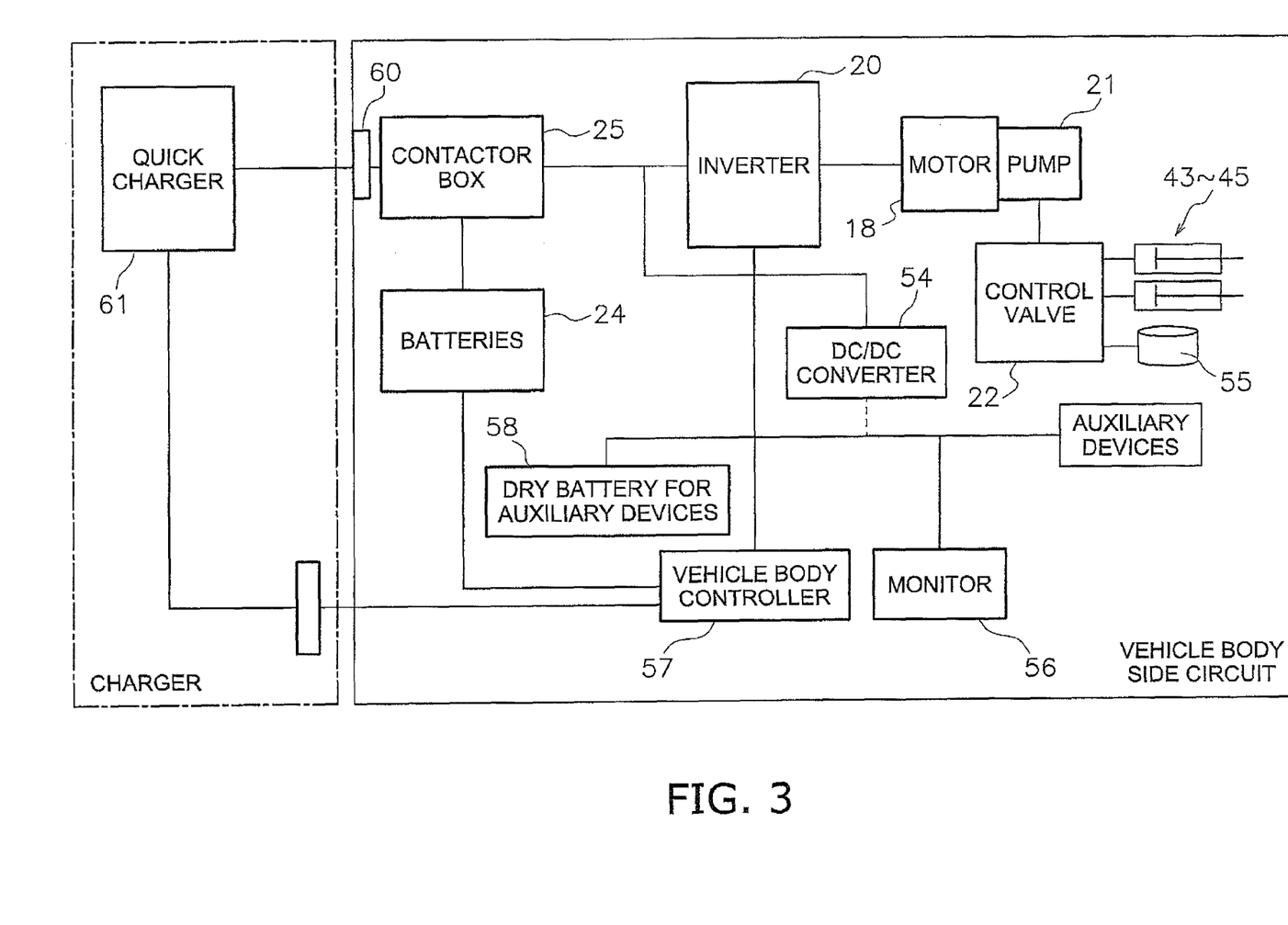
FIG. 3 is a system block diagram of the electric excavator.

As described above, in the electric excavator 1 of the present exemplary embodiment, the electric motor 18 is driven by the batteries 24, and in turn, the electric motor 18 drives the hydraulic pump 21 for actuating the excavator mechanism 4 and the travelling mechanisms 11. FIG. 3 represents the system blocks of the present electric excavator 1. It should be noted that FIG. 3 represents only the main components.

The batteries 24 are connected to the contactor box 25, and the outputs of the contactor box 25 are connected to the inverter device 20 and a DC/DC converter 54. An electromagnetic contact (contactor), a fuse, a sensor for detecting voltage and current, and so forth are installed in the contactor box 25. The inverter device 20 is connected to the electric motor 18, and the output of the electric motor 18 is connected to the hydraulic pump 21. The hydraulic pressure from the hydraulic pump 21 is supplied through the control valve 22 to the respective hydraulic cylinders 43 to 45 of the excavator mechanism, the revolving and travelling motors 55. On the other hand, the direct voltage, appropriately converted by the DC/DC converter 54, is supplied as the drive voltage for a monitor 56 installed in the cab 5 and a vehicle body controller 57. The vehicle body controller 57 is connected to the inverter device 20, the batteries 24 and a quick charger 61. It should be noted that other than the batteries 24 for driving the electric motor, the excavator 1 is additionally equipped with a dry battery 58 for auxiliary devices that is installed in a well-known excavator.

Further, the present electric excavator 1 has a charge connector 60, and is capable of charging the batteries 24 through the charge connector 60 by means of the external quick charger 61. The quick charger 61 is connected to the contactor box 25 through the charge connector 60. The vehicle body controller 57 is configured to monitor the charged voltage in the batteries 24 and control the actuation of the quick charger 61 so as not to overcharge the batteries 24.

Revolving Frame

Figure 4:
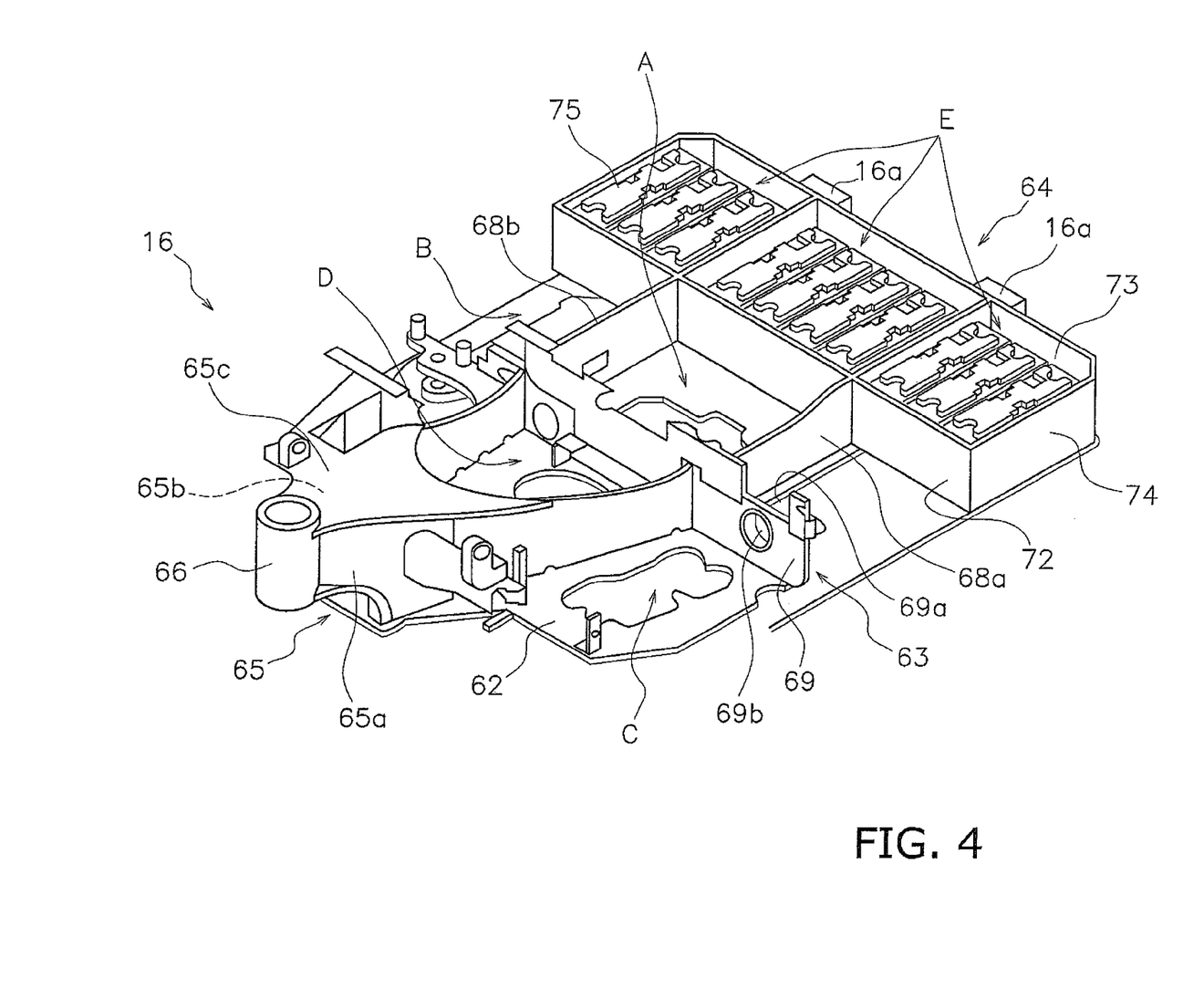
FIG. 4 is an external perspective view of a revolving frame and a first battery group.

As illustrated in FIG. 4, the revolving frame 16 includes: a base plate 62 formed in a shape extended in the back-and-forth direction; and device installation compartment plates 63 and a battery accommodation compartment plate 64 that are respectively fixed onto the base plate 62.

A bracket 66 (an example of a working machine support bracket) for supporting the working machine is fixed to the front end portion of the base plate 62 through a plurality of support plates 65. The plural support plates 65 include: a left support plate 65*a* and a right support plate 65*b* that are respectively fixed at the bottom ends thereof to the base plate 62; and an upper support plate 65*c* that is fixed to the upper surfaces of the left and right support plates 65*a* and 65*b* and has a roughly triangular shape in a plan view. The bracket 66 is formed in a cylindrical shape having a through hole 66*a* in the up-and-down direction and supports the swing post 36 through the pin (not illustrated in the figures) inserted into the through hole 66*a*. It should be noted that the left and right support plates 65*a* and 65*b* and the upper support plate 65*c* are made of plates with thicknesses greater than the thickness of the base plate 62.

The device installation compartment plates 63 include: left and right vertical partition plates 68*a* and 68*b* that are disposed at an interval in the right-and-left direction; and a single horizontal partition plate 69. The left vertical partition plate 68*a* is disposed between the left support plate 65*a* and the battery accommodation compartment plate 64. On the other hand, the right vertical partition plate 68*b* is disposed between the right support plate 65*b* and the battery accommodation compartment plate 64. Further, the left and right vertical partition plates 68*a* and 68*b* are made of plates with thicknesses greater than the thickness of the base plate 62. The horizontal partition plate 69 is disposed roughly on the center parts of the left and right vertical partition plates 68*a* and 68*b* in the back-and-forth direction, while being disposed over the range from the left end portion to the right end portion of the revolving frame 16. It should be noted that the horizontal partition plate 69 has a cutout 69*a* and a through hole 69*b* through which pipes and so forth for connecting the respective devices pass.

Regions for installing the respective devices are formed on the revolving frame 16 by the respective plates as described above. Specifically, the electric motor 18 and the hydraulic pump 21 are disposed in a region A, whereas the refrigeration unit 33 including the radiator and so forth is disposed in a region B. Further, hydraulic devices including the control valve 22 and so forth are disposed in a region C, whereas a mechanism for revolving the revolving frame 16, including the pinion gear and so forth, is disposed in a region D.

The battery accommodation compartment plate 64 is disposed on the rear end portion of the revolving frame 16 and form a region E for accommodating a plurality of batteries in the inside thereof. The battery accommodation compartment plate 64 is formed by a pair of a front plate 72 and a rear plate 73 and a pair of a left side plate 74 and a right side plate 75 in order to form the battery accommodation region E opened upwards. Further, the left and right vertical partition plates 68*a* and 68*b* are extended into the battery accommodation region E. The left and right vertical partition plates 68*a* and 68*b*, extended into the battery accommodation region E, connect the front plate 72 and the rear plate 73.

The rear plate 73 is disposed along the rear edge of the revolving frame 16, whereas the front plate 72 is disposed forwards of the rear plate 73 at an interval. Further, the front plate 72 and the rear plate 73 are disposed on the rear end portion of the revolving frame 16 while being extended from the left end portion to the right end portion. The right side plate 75 and the left side plate 74 are respectively disposed along the right and left edges of the revolving frame 16.

Here, the plural plates 63 and 64 for forming the respective compartments function as ribs for reinforcing the strength of the revolving frame 16. Therefore, the revolving frame 16 can be increased in its strength without being provided with a special member and so forth. Especially, the left and right vertical partition plates 68*a* and 68*b* are continuously formed between the left and right support plates 65*a* and 65*b* and the battery accommodation compartment plate 64. Therefore, the strength of the revolving frame 16 can be further increased. Further, the strength of the rear part of the revolving frame 16 is further reinforced by the two partition plates 68*a* and 68*b* in the battery accommodation region E.

Battery Holding Mechanism

Figure 5:
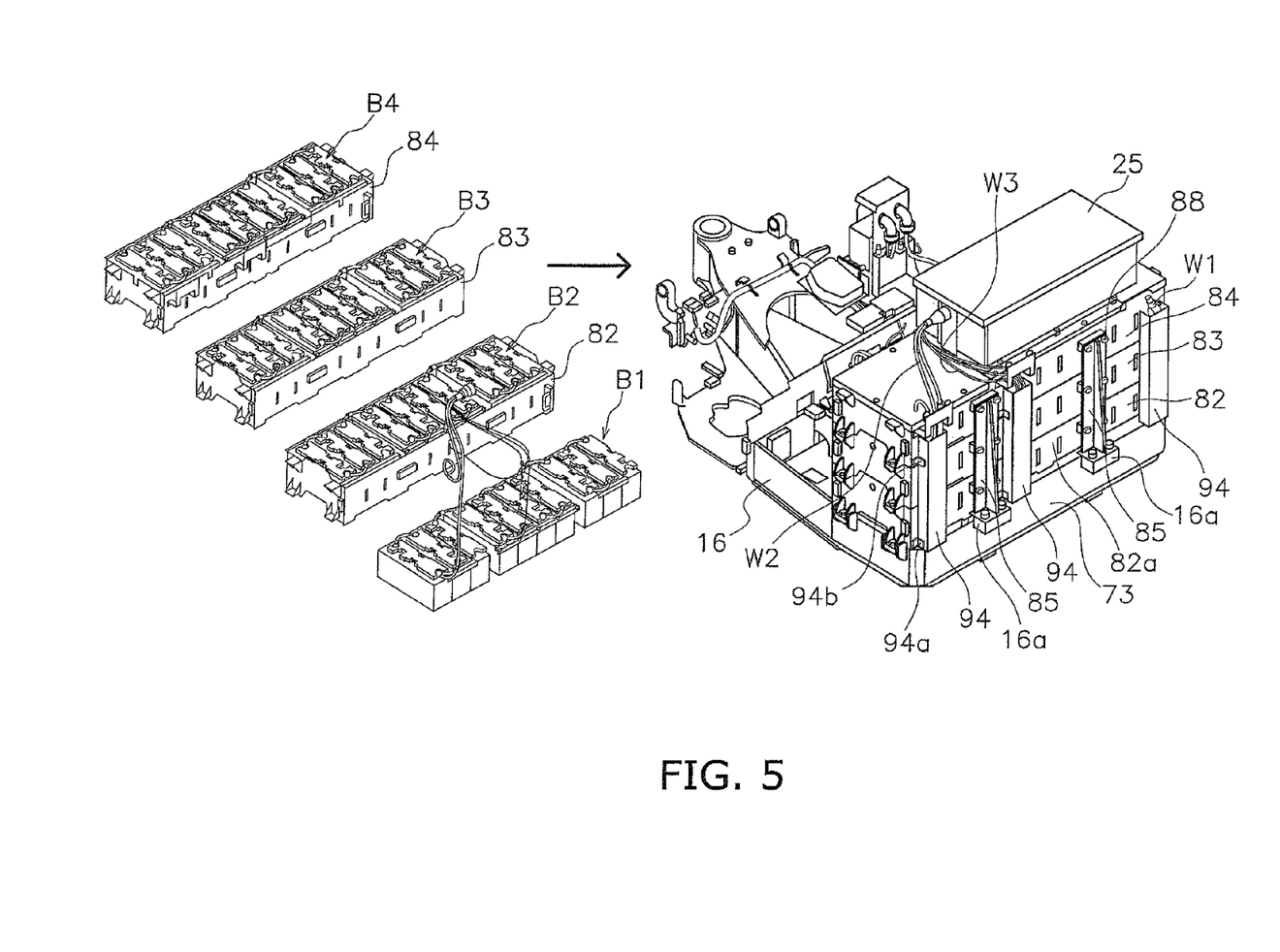
FIG. 5 is an external perspective view of battery groups and a battery holding structure.

The plural batteries 24 forming the power source unit 19 are disposed in the battery accommodation region E produced in the rear end portion of the revolving frame 16. As illustrated in FIG. 2, the plural batteries 24 are disposed in alignment with each other in the right-and-left direction while being stacked in the vertical direction. In the present exemplary embodiment, the plural batteries 24 are stacked in four layers. In the following explanation, plural batteries in the lowest layer illustrated in FIGS. 4 and 5 are referred to as a first battery group B1, while plural batteries in the second layer, those in the third layer and those in the fourth layer, which are illustrated in FIG. 5, are referred to as a second battery group B2, a third battery group B3 and a fourth battery group B4, respectively.

First, as illustrated in FIG. 4, the first battery group B1 is mounted to the battery accommodation region E enclosed by the battery accommodation compartment plate 64 on the revolving frame 16. On the other hand, as illustrated in FIG. 5, the second, third and fourth battery groups B2 to B4 are accommodated in second, third and fourth battery cases 82, 83 and 84, respectively.

Each of the battery cases 82 to 84 has a bottom wall and front, rear, right and left sidewalls, and is thus formed in a box shape upwardly opened. Further, the respective battery cases 82 to 84 are fixed to the rear end portion of the revolving frame 16 by two pillars 85 formed in the same shape.

Figure 6:
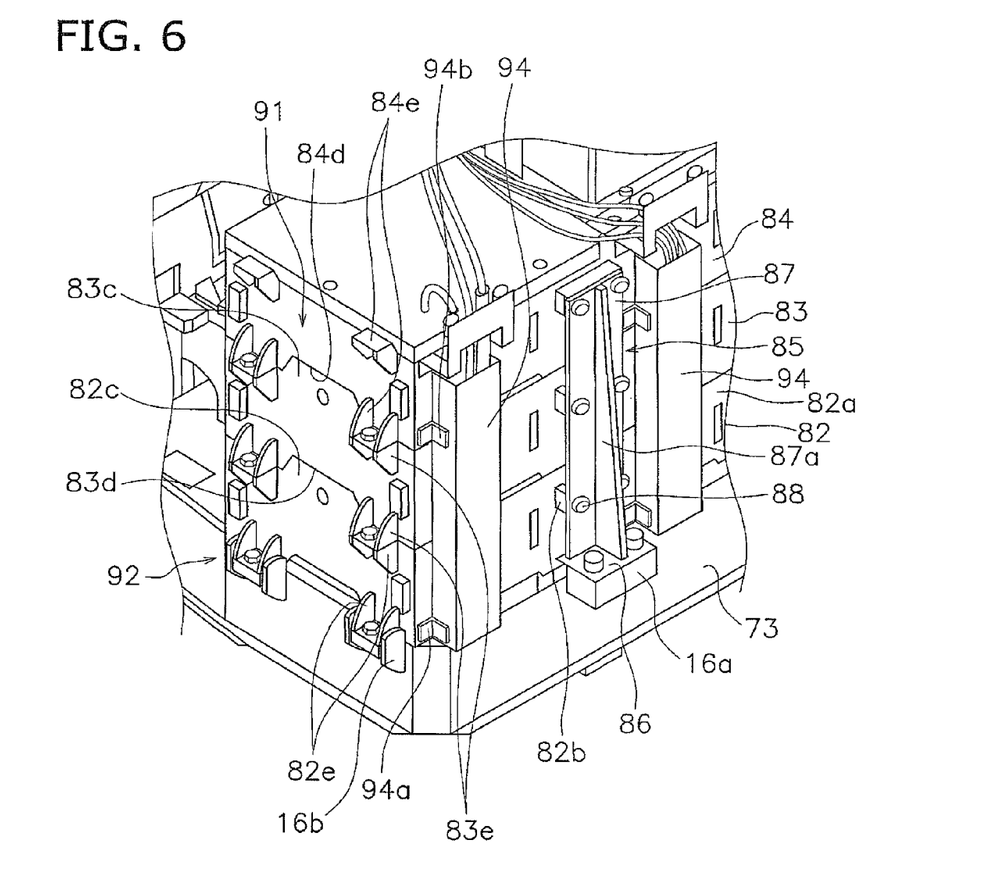
FIG. 6 is a partial enlarged view of FIG. 5.

FIG. 6 illustrates an enlarged view of fixation parts between the pillars 85 and the respective battery cases 82 to 84. As illustrated in FIG. 6, the rear end portion of the revolving frame 16 is provided with two mount parts 16*a* (examples of fixation brackets) protruded rearwards. The mount parts 16*a* are formed on the rear surface of the rear plate 73 of the battery accommodation compartment plate 64, while being positioned correspondingly to the left and right vertical partition plates 68*a* and 68*b*. Each pillar 85 has: a frame fixation portion 86 formed on the bottom end thereof; and a case fixation portion 87 upwardly extended from the frame fixation portion 86. The frame fixation portion 86 is fixed to each mount part 16*a* of the revolving frame 16 by means of bolts. Further, a rib 87*a* extended up and down is formed on the rear surface of the case fixation portion 87, and reinforces the strength of the case fixation portion 87.

Here, all the fixation parts between the respective battery cases 82 to 84 and the pillars 85 are the same. Therefore, explanation will be herein made for a relation between the second battery case 82 and the pillars 85. As illustrated in FIG. 6, a plurality of nut attachment bases 82*b* are fixed to a rear sidewall 82*a* of the second battery case 82. Further, the case fixation portion 87 of each pillar 85 has through holes formed in positions corresponding to each nut attachment base 82*b* of the second battery case 82. Bolts 88, penetrating through the through holes, are screwed and fixed into nut portions formed in each nut attachment base 82*b* of the second battery case 82.

As described above, the two pillars 85 are fixed to the rear end portion of the revolving frame 16, and the second to fourth battery cases 82 to 84 are fixed to the two pillars 85. Thus, the second to fourth battery cases 82 to 84 are fixed to the revolving frame 16.

Further, the respective battery cases 82 to 84 are provided with a positioning structure 81 and a lateral support structure 92 on the right and left sidewalls thereof The positioning structure 91 is a structure for restricting the battery cases 82 to 84 from being misaligned relatively to each other in the back-and-forth direction. On the other hand, the lateral support structure 92 is a structure for fixing the right and left sidewalls of the battery cases 82 to 84 to the revolving frame 16.

The positioning structure 91 is formed by convex and concave portions formed on the sidewalls of the respective battery cases 82 to 84. Specifically, first, convex portions 82*c* and 83*c*, having a trapezoid shape in a side view, are formed in the center parts in the back-and-forth direction on the top surfaces of the sidewalls of the second and third battery cases 82 and 83. Further, concave portions 83*d* and 84*d*, into which the convex portions 82*c* and 83*c* of the second and third battery cases 82 and 83 are fitted, are formed on the lower surfaces of the sidewalls of the third and fourth battery cases 83 and 84. The second to fourth battery cases 82 to 84 are positioned by the convex and concave portions fitted to each other, while being restricted from moving in the back-and-forth direction.

The lateral support structure 92 is formed by coupling brackets formed on the sidewalls of the respective battery cases 82 to 84. Specifically, each of the battery cases 82 to 84 has four coupling brackets 82*e* to 84*e* formed on the both top and bottom end portions of the both front and rear ends of each sidewall thereof Further, the coupling brackets 82*e*, formed on the bottom end portions of the second battery case 82, are fixed to coupling brackets 16*b* formed on the revolving frame 16 by means of bolts. Further, the coupling brackets 82*e*, formed on the top end portions of the second battery case 82, are coupled to the coupling brackets 83*e* formed on the bottom end portions of the third battery case by means of bolts. Furthermore, the coupling brackets 83*e*, formed on the top end portions of the third battery case 83, are coupled to the coupling brackets 84*e* formed on the bottom end portions of the fourth battery case 84 by means of bolts.

Thus, all the sidewalls of the battery cases 82 to 84 are designed to be fixed to the revolving frame 16 by coupling the respective battery cases 82 to 84 to each other by means of the coupling brackets 82*e* to 84*e*, and simultaneously, by fixing the coupling brackets 82*e* of the second battery case to the revolving frame 16.

Cable Protection

The plural batteries 24 are connected at the terminals thereof by means of electric cables (hereinafter simply referred to as cables). Further, as illustrated in FIG. 5, the vertically adjacent rightmost batteries, included in the respective stacked battery groups B1 to B4, are connected to each other at the terminals thereof by means of cables W1, whereas the leftmost batteries, included in the respective stacked battery groups B1 to B4 of the respective battery cases 82 to 84, are separately connected to the contactor box 25 by means of cables W2. Further, the batteries, located roughly in the center parts of the battery groups B1 to B4 in the right-and-left direction in the respective layers, are separately connected at the terminals thereof to the contactor box 25 by means of cables W3. Further, the respective cables W1, W2 and W3 are backwardly pulled out of the respective battery cases 82 to 84 through openings bored through the rear sidewalls of the respective battery cases 82 to 84.

As described above, the plural cables are designed to be outwardly exposed to the rear of the battery cases 82 to 84 from the center part and the both rightmost and leftmost parts of the battery groups B1 to B4 in the respective layers. In view of this, in the present exemplary embodiment, three guard members 94 are provided for protecting the cables.

All the three guard members 94 have the same shape. Each guard member 94 is an upwardly and downwardly opened member with a squared C-shaped cross-section and has a rear wall and right and left sidewalls. Further, the cables are accommodated inside the guard members 94. Each guard member 94 has laterally protruded fixation portions 94*a* and 94*b* on the lower and upper portions of the right and left sidewalls. Further, the lower-side fixation portions 94*a* are fixed to the rear sidewall of the second battery case 82 by means of bolts, whereas the upper-side fixation portions 94*b* are fixed to the rear sidewall of the fourth battery case 84 by means of bolts.

It should be noted that the respective battery cases 82 to 83 are not provided with any devices and mechanisms on the front sidewalls thereof for fixing the respective battery cases 82 to 84 to the revolving frame 16 or for fixing the battery cases to each other. Therefore, the battery cases 82 to 84 can be disposed adjacently to the heat shield plate 28, and accordingly, the power source unit 19 can be entirely disposed forwards. In other words, the rear part of the revolving frame 16 can be inhibited from being protruded rearwards.

Gas Discharge Structure of Battery

The plural batteries 24 of a sealed type, forming a part of the power source unit 19, are lead shield batteries. The batteries 24 are configured to cause large electric current to flow therethrough in charging and activation, and are configured to produce gas when the temperature is increased. A processing of returning the produced gas to battery liquid is performed within the batteries. However, in some cases, the gas cannot be completely processed inside the batteries. In view of this, a gas discharge structure is provided for discharging the inside gas to the outside of the batteries when the pressure of the inside of the batteries reaches a predetermined pressure or greater. Further, the battery liquid is configured to be released when the temperature is further increased. The structure is configured to be actuated also in an emergency.

Figure 7:
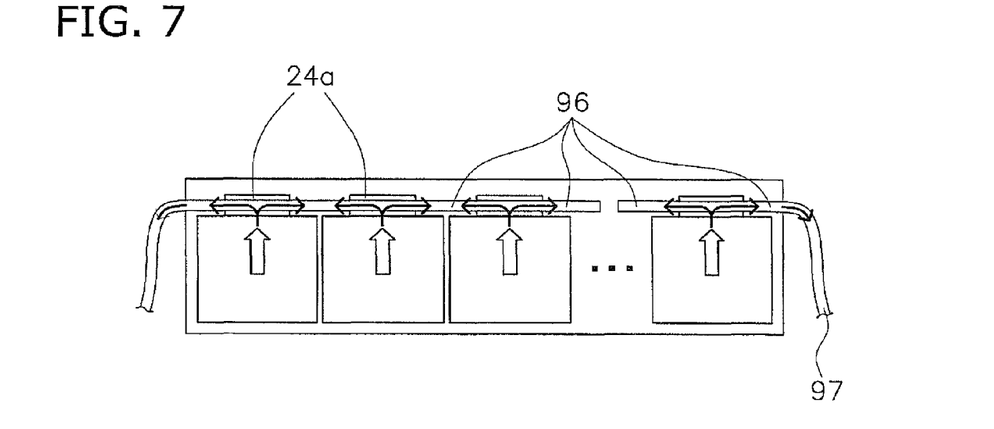
FIG. 7 is a schematic view of a gas discharge structure.
Figure 8:
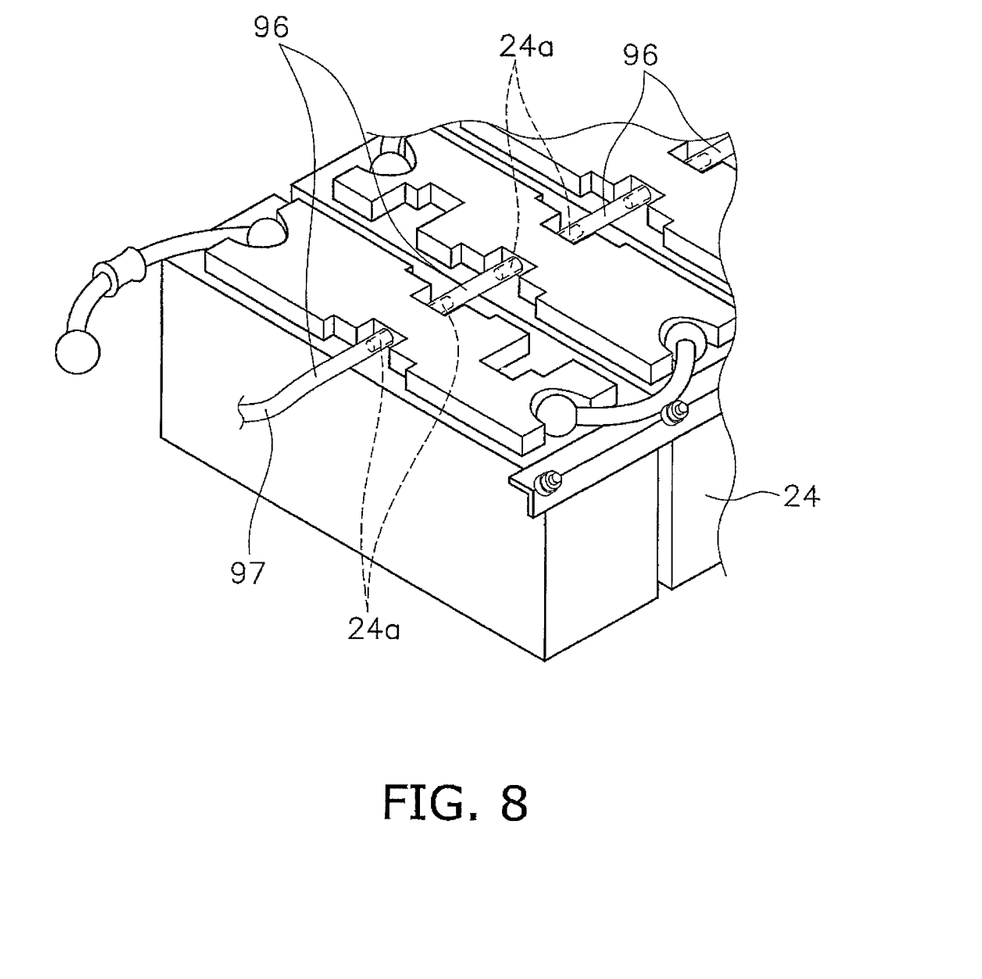
FIG. 8 is an external perspective view of a part of the gas discharge mechanism.
Figure 9:
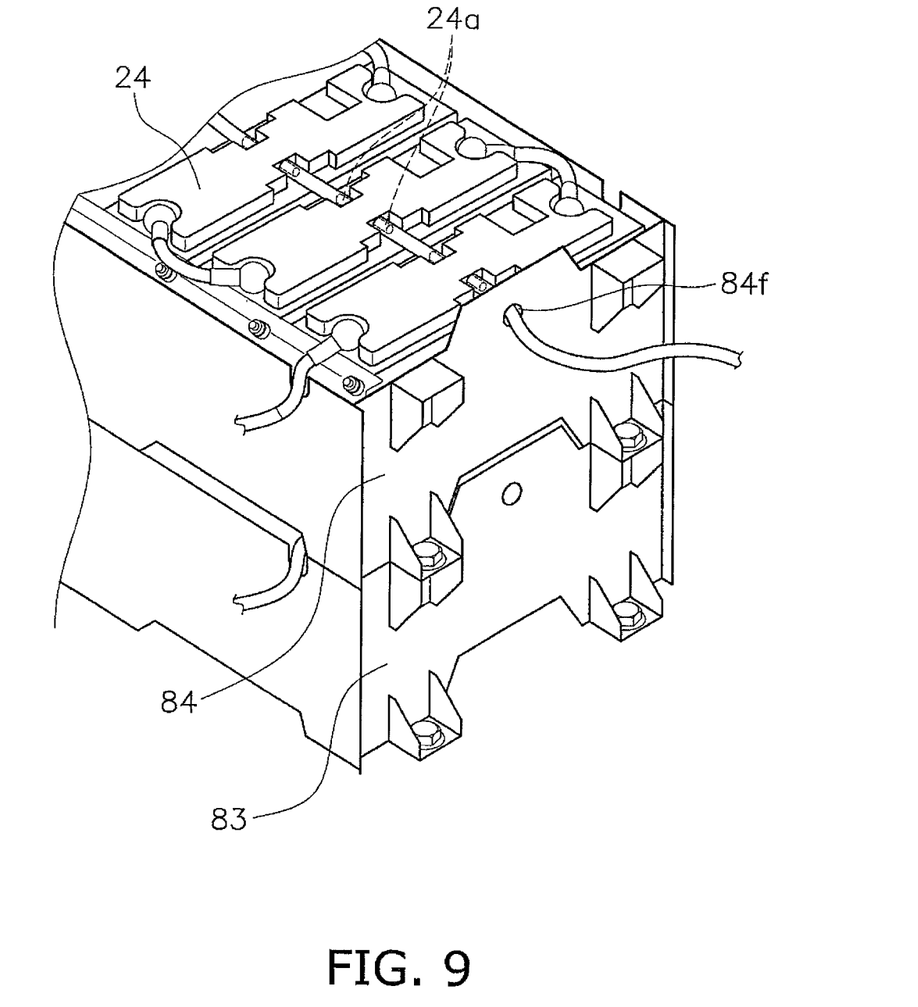
FIG. 9 is an external perspective view of a part of the gas discharge mechanism.

FIG. 7 represents a schematic diagram of the gas discharge structure. Further, FIG. 8 illustrates a part of the gas discharge structure. As illustrated in these figures, a pair of discharge ports 24*a* and 24*a* are formed on the top surface of each battery 24, while being protruded in the both directions that the batteries 24 are aligned, i.e., leftwards and rightwards. The gas, which was generated inside the batteries and could not be completely processed, is discharged from the pair of discharge ports 24*a* and 24*a* through an inner pressure control valve (not illustrated in the figures) embedded inside each battery. Further, the discharge ports 24*a* of adjacent batteries are connected through communication hoses 96. Furthermore, drain hoses 97 are connected to the outer discharge ports 24*a* of the batteries disposed on the both ends of the battery groups B1 to B4 in the respective layers. One ends of the respective drain hoses 97 are connected to the discharge ports 24*a* of the relevant batteries 24, whereas the other ends of the respective drain hoses 97 are pulled to the outside of the vehicle body through hose openings 84*f* bored through the right and left sidewalls of the respective battery cases 82 to 84 as illustrated in FIG. 9. Further, the gas, discharged thereto through the respective communication hoses 96, is discharged to the outside through the respective drain hoses 97.

Action

The inverter device 20 converts DC power from the batteries 24 of the power source unit 19 into AC power with an arbitrary frequency. The electric motor 18 is driven by means of AC power to be supplied thereto from the inverter device 20, and in turn, drives the hydraulic pump 21. Further, the hydraulic pressure from the hydraulic pump 21 is supplied through the control valve 22 to the respective hydraulic cylinders 43 to 45, the revolving and travelling motors 55.

A vehicle driving operation and a working operation are similar to those of a hydraulic excavator equipped with a well-known engine. In other words, when an operator operates the respective operating levers, the hydraulic pressure to be supplied from the hydraulic pump 21 is controlled in the control valve 22 in response to the operation. Accordingly, the travelling mechanisms 11 are driven at an appropriate speed in response to the operation, and a work is performed in response to the operation.

Incidentally, in charging the batteries 24, the quick charger 61 is connected to the charge connector 60. DC power, supplied from the quick charger 61, is applied to the batteries 24 through the contactor box 25. The batteries 24 are thereby charged. While being charged, the batteries 24 produce gas. The produced gas is processed inside, but in some cases, cannot be completely processed depending on a charged state. In such case, the inner pressure control valves embedded inside the batteries are actuated, and thereby, the gas is discharged to the outside of the batteries. The gas or the battery liquid, discharged from the respective batteries 24, is directed to the both ends of the respective battery groups B1 to B4 through the communication hoses 96 and is discharged to the outside of the vehicle body through the drain hoses 97 on the both sides.

Features (1) The plates 63 and 64 for forming the respective compartments produce the regions for disposing a variety of component members on the revolving frame 16, and are simultaneously designed to function as ribs of the revolving frame 16. Therefore, the revolving frame 16 can be reinforced in its strength without using a special member. Especially, the revolving frame 16 is reinforced with use of the battery accommodation compartment plate 64. Therefore, the batteries can be efficiently accommodated on the revolving frame 16, while the revolving frame 16 can be reinforced.

(2) The left and right vertical partition plates 68a and 68b, respectively having a relatively large plate thickness, pass through the roughly center part of the base frame 16 back and forth. Therefore, the vehicle body can be inhibited from being distorted even when it has a back-and-forth imbalance in its weight.

(3) The battery accommodation region E is produced on the rear end portion of the revolving frame 16 by the battery accommodation compartment plate 64. Therefore, the batteries can be mounted thereto instead of a counterweight provided for a well-known work vehicle.

(4) The pillars 85 are fixed to the mount parts 16a mounted to the rear plate 73 of the battery accommodation compartment plate 64, and support the battery cases 82 to 84 with respect to the revolving frame 16. Therefore, it is not required to provide components for supporting the battery cases 82 to 84 on the front surfaces of the battery cases 82 to 84. The power source unit 19 can be thereby disposed forwards. With the structure, it is possible to implement an excavator of a small revolving type that the rear revolving radius thereof is reduced.

(5) The mount parts 16a for fixing the battery cases 82 to 84 are mounted in positions corresponding to the left and right vertical partition plates 68a and 68b in the vehicle width direction. Thus, this enhances the strength of the portions to which the mount parts 16a are mounted, and thereby, the battery cases can be stably fixed.

Other Exemplary Embodiments

The present invention is not limited to the exemplary embodiment as described above, and a variety of changes or modifications can be made without departing from the scope of the present invention.

(a) In the aforementioned exemplary embodiment, the present invention has been applied to the revolving frame of the electric excavator. However, the present invention can be similarly applied to a base frame of an electric work vehicle of another type.

(b) The shape, the number, the dimension and so forth of the device installation compartment plates and those of the battery accommodation compartment plate are not limited to those of the aforementioned exemplary embodiment, and a variety of changes can be made thereto.

(c) In the aforementioned exemplary embodiment, the right and left vertical partition plates partially form the partition plates within the battery accommodation region. However, compartment plates may be provided separately from the right and left vertical partition plates.

In the illustrated embodiments, the plural compartment plates function as the ribs for reinforcing the base frame. Therefore, the base frame can be enhanced in its strength. Further, the battery accommodation compartment plate produces the battery accommodation region, and simultaneously, functions as the rib for reinforcing the base frame. Therefore, the batteries can be efficiently accommodated on the base frame, while the base frame can be reinforced.

The invention claimed is:

1. A base frame for an electric work vehicle equipped with a battery-driven electric motor, the base frame comprising:
   a base plate;
   a plurality of device installation compartment plates fixed onto the base plate, the device installation compartment plates forming a plurality of installation regions for mounting a variety of devices of the vehicle onto the base plate; and
   a battery accommodation compartment plate fixed onto the base plate, the battery accommodation compartment plate forming a region for accommodating a plurality of batteries in an inside thereof.

2. The base frame for an electric work vehicle recited in claim 1, wherein
   the battery accommodation compartment plate is disposed on a rear end portion of the base plate in a vehicle back-and-forth direction, the battery accommodation compartment plate at least having front, rear, right and left plates enclosing the region for accommodating the plurality of batteries.

3. The base frame for an electric work vehicle recited in claim 2, wherein
   the device installation compartment plates include at least one vertical partition plate extending on the base plate from a front portion of the base plate to the rear end portion of the base plate through the battery accommodation region formed by the battery accommodation compartment plate in the vehicle back-and-forth direction.

4. The base frame for an electric work vehicle recited in claim 3, wherein
the battery accommodation region accommodates a plurality of battery cases in a stacked state, each of the battery cases accommodating a plurality of batteries, and
the battery accommodation compartment plate is provided with a fixation bracket to which a pillar for supporting the plurality of battery cases is fixed, the fixation bracket being mounted onto a rear surface of the rear plate of the battery accommodation compartment plate.

5. The base frame for an electric work vehicle recited in claim 4, wherein
the battery accommodation compartment plate has at least one partition plate disposed within the battery accommodation region enclosed by the front, rear, right and left plates.

6. The base frame for an electric work vehicle recited in claim 5, wherein
the at least one partition plate is a portion of the vertical partition plate, the portion passing through the battery accommodation region.

7. The base frame for an electric work vehicle recited in claim 4, wherein
the at least one vertical partition plate is disposed in a position corresponding to the fixation bracket in a vehicle width direction.

8. The base frame for an electric work vehicle recited in claim 3, wherein
the base plate is configured and arranged to revolve about a revolving center and forms a part of an upper revolving unit of an excavator,
the base plate is provided with a working machine support bracket to which a working machine of the work vehicle is attached, the working machine support bracket being mounted onto a front end portion of the base plate, and
the vertical partition plate continuously extends from the working machine support bracket to the rear end portion of the base frame.

9. The base frame for an electric work vehicle recited in claim 1, wherein
the device installation compartment plates include at least one horizontal partition plate extending on the base frame in a vehicle right-and-left direction.

10. An electric work vehicle comprising:
a vehicle body frame including the base frame recited in claim 1;
a travelling mechanism connected to the vehicle body frame;
a working machine unit including a working machine and a working machine drive part configured and arranged to drive the working machine;
an electric motor configured and arranged to drive the travelling mechanism and the working machine unit; and
a power source unit including the plurality of batteries, the power source unit configured and arranged to supply electric power to the electric motor.

11. The base frame for an electric work vehicle recited in claim 2, wherein
the device installation compartment plates include at least one vertical partition plate that connects the front plate and the rear plate.

* * * * *